United States Patent
Merino Lopez et al.

(10) Patent No.: US 9,593,266 B2
(45) Date of Patent: *Mar. 14, 2017

(54) METHOD OF MANUFACTURING A SELF-SEALING COMPOSITION

(75) Inventors: José Merino Lopez, Riom (FR); Frédéric Pialot, Moissat (FR); Damien Fombelle, Vebret (FR); Gérard Bor, La Roche Noire (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 959 days.

This patent is subject to a terminal disclaimer.

(21) Appl. No.: 13/575,501

(22) PCT Filed: Jan. 26, 2011

(86) PCT No.: PCT/EP2011/051027
§ 371 (c)(1),
(2), (4) Date: Oct. 9, 2012

(87) PCT Pub. No.: WO2011/092179
PCT Pub. Date: Aug. 4, 2011

(65) Prior Publication Data
US 2015/0307756 A1 Oct. 29, 2015

(30) Foreign Application Priority Data
Jan. 28, 2010 (FR) ...................... 10 50603

(51) Int. Cl.
| | | |
|---|---|---|
| C08K 9/00 | (2006.01) |
| C09J 107/00 | (2006.01) |
| B29B 7/10 | (2006.01) |
| B29B 7/40 | (2006.01) |
| B29B 7/42 | (2006.01) |
| B29C 47/60 | (2006.01) |
| B29D 30/06 | (2006.01) |
| B60C 19/12 | (2006.01) |
| C08J 3/00 | (2006.01) |
| C08J 3/20 | (2006.01) |
| B01F 7/00 | (2006.01) |
| B60C 1/00 | (2006.01) |
| C08J 3/18 | (2006.01) |
| C08J 3/22 | (2006.01) |
| C08K 3/04 | (2006.01) |
| C08K 5/31 | (2006.01) |

(Continued)

(52) U.S. Cl.
CPC ......... *C09J 107/00* (2013.01); *B01F 7/00416* (2013.01); *B29B 7/103* (2013.01); *B29B 7/402* (2013.01); *B29B 7/421* (2013.01); *B29C 47/1081* (2013.01); *B29C 47/6012* (2013.01); *B29D 30/0685* (2013.01); *B60C 1/0008* (2013.04); *B60C 19/122* (2013.04); *C08J 3/005* (2013.01); *C08J 3/18* (2013.01); *C08J 3/201* (2013.01); *C08J 3/22* (2013.01); *C08K 3/04* (2013.01); *C08K 5/31* (2013.01); *B01F 2215/0049* (2013.01); *B29C 47/0004* (2013.01); *B29C 47/0009* (2013.01); *B29C 47/10* (2013.01); *B29C 47/1027* (2013.01); *B29C 47/1045* (2013.01); *B29C 47/1063* (2013.01); *B29C 47/38* (2013.01); *B29C 47/668* (2013.01); *B29C 73/163* (2013.01); *B29D 2030/0686* (2013.01); *B29K 2007/00* (2013.01); *B29K 2009/00* (2013.01); *B29K 2105/16* (2013.01); *B29L 2030/00* (2013.01); *C08K 2003/045* (2013.01)

(58) Field of Classification Search
CPC ....................................... C08L 9/00; C08J 3/22
See application file for complete search history.

(56) References Cited

U.S. PATENT DOCUMENTS

| 3,663,268 A | 5/1972 | Wilson ................. 117/76 T |
| 3,683,511 A | 8/1972 | Johnson et al. |

(Continued)

FOREIGN PATENT DOCUMENTS

| DE | 102007031274 A1 | 1/2009 |
| EP | 0161201 A2 | 11/1985 |

(Continued)

OTHER PUBLICATIONS

"Plasticizers." http:greenetpractice/pop-up, retrieved on Dec. 18, 2012.*

(Continued)

*Primary Examiner* — Hannah Pak
(74) *Attorney, Agent, or Firm* — Fitzpatrick, Cella, Harper & Scinto

(57) ABSTRACT

A self-sealing elastomer composition that includes a diene elastomer, a hydrocarbon resin with a given softening temperature, and a liquid plasticizing agent, is manufactured according to a process that includes successive stages. In one stage, the hydrocarbon resin is incorporated in the diene elastomer by kneading the resin and the elastomer in a mixer at or up to a temperature referred to as "hot compounding" temperature, which is greater than the softening temperature of the resin, in order to obtain a masterbatch. In another stage, the liquid plasticizing agent is incorporated in the masterbatch by kneading the agent and the masterbatch in the same mixer or in another mixer, in order to obtain the self-sealing composition. The self-sealing composition then is formed dimensionally.

27 Claims, 5 Drawing Sheets

(51) Int. Cl.
| | | |
|---|---|---|
| B29C 47/00 | (2006.01) | |
| B29C 47/10 | (2006.01) | |
| B29C 47/38 | (2006.01) | |
| B29C 73/16 | (2006.01) | |
| B29K 7/00 | (2006.01) | |
| B29K 9/00 | (2006.01) | |
| B29L 30/00 | (2006.01) | |
| B29K 105/16 | (2006.01) | |
| B29C 47/66 | (2006.01) | |

(56) References Cited

U.S. PATENT DOCUMENTS

| | | | |
|---|---|---|---|
| 4,616,048 A | 10/1986 | De Trano et al. | |
| 4,687,794 A * | 8/1987 | Huddleston | B29C 47/38 366/302 |
| 4,913,209 A | 4/1990 | Hong et al. | 152/504 |
| 5,085,942 A | 2/1992 | Hong et al. | 428/492 |
| 5,295,525 A | 3/1994 | Sanda, Jr. | |
| 5,914,364 A | 6/1999 | Cohen et al. | |
| 6,103,808 A * | 8/2000 | Hashimoto | C08K 5/01 208/309 |
| 6,156,822 A | 12/2000 | Materne et al. | |
| 6,242,523 B1 | 6/2001 | Blok et al. | |
| 6,397,912 B1 | 6/2002 | Watanabe et al. | |
| 6,849,674 B2 | 2/2005 | Yatsuyanagi et al. | 524/83 |
| 7,073,550 B2 | 7/2006 | Reiter et al. | |
| 7,825,183 B2 | 11/2010 | Robert et al. | 524/476 |
| 7,834,074 B2 | 11/2010 | Brunelet et al. | |
| 7,882,874 B2 | 2/2011 | Robert et al. | |
| 8,609,758 B2 | 12/2013 | Merino-Lopez et al. | |
| 8,710,140 B2 * | 4/2014 | Pialot | B29C 73/163 523/166 |
| 8,871,852 B2 | 10/2014 | Lesage et al. | |
| 8,957,132 B2 * | 2/2015 | Voge | B29C 73/163 523/166 |
| 2002/0115767 A1 | 8/2002 | Cruse et al. | |
| 2003/0230376 A1 | 12/2003 | Smith et al. | |
| 2004/0092644 A1 | 5/2004 | Labauze et al. | |
| 2004/0092648 A1 * | 5/2004 | Jones | C08K 5/01 524/502 |
| 2006/0083881 A1 | 4/2006 | Saito et al. | |
| 2007/0161735 A1 | 7/2007 | Bergman et al. | |
| 2007/0167557 A1 | 7/2007 | Dumke et al. | |
| 2008/0009564 A1 | 1/2008 | Robert et al. | |
| 2008/0156404 A1 | 7/2008 | Brunelet et al. | |
| 2009/0186965 A1 | 7/2009 | Rodgers et al. | 524/52 |
| 2009/0292063 A1 | 11/2009 | Robert et al. | 524/518 |
| 2010/0204359 A1 | 8/2010 | Robert et al. | |
| 2010/0256275 A1 | 10/2010 | Lopitaux | 524/285 |
| 2011/0165408 A1 * | 7/2011 | Lesage | B29C 73/163 428/320.2 |
| 2011/0198009 A1 | 8/2011 | Merino-Lopez et al. | |
| 2012/0115984 A1 * | 5/2012 | Pialot | B29C 73/163 523/351 |
| 2013/0172474 A1 | 7/2013 | Voge et al. | 524/518 |

FOREIGN PATENT DOCUMENTS

| | | |
|---|---|---|
| FR | 2 845 093 A1 | 4/2004 |
| FR | 2 877 348 A1 | 5/2006 |
| FR | 2866028 A1 | 8/2012 |
| GB | 1 342 151 | 12/1973 |
| JP | 1-113483 A | 5/1989 |
| JP | 2006-282830 A | 10/2006 |
| JP | 2009-504810 A | 2/2009 |
| JP | 2009-114385 A | 5/2009 |
| WO | 01/85837 A2 | 11/2001 |
| WO | WO 2008/141749 A1 | 11/2008 |
| WO | WO 2009/059709 A1 | 5/2009 |
| WO | 2009/156050 A1 | 12/2009 |
| WO | 2010/009851 A2 | 1/2010 |

OTHER PUBLICATIONS

Anomyme, "Material safety datasheet: Sundex 8125," pp. 1-5, XP002515554, http://www.recarroll.com/cw3/Assets/products_files/Sundex%208125TN.pdf>, Feb. 17, 2009.

J.C. Mitchell:, "The melting point of cis-1,4-polybutadiene," Journal of Polymer Science Part B: Polymer Letters, vol. 1 No. 6, pp. 285-288, 1963, XP002515576, http://dx.doi.org/10.1002/pol,1963.110010604>, Feb. 17, 2009.

A.V. Lesikar, "On the self-association of the normal alcohols and the glass transition in alcohol-alcohol solutions," Journal of Solution Chemistry, vol. 6, No. 2 pp. 81-93, http://dz.doi.org/10.1007/BF00643434, Feb. 1977.

Polylimonene Data Sheet (softening point), Sigma Aldrich, 2015.

Neville Chemical Company, Nevtac 99, 80 and 78 softening point.

Database WPI Week 200680, Thomson Scientific, London, GB XP002596387.

T7140 Sigma Aldrich, Glyceryl Trioleate, http://www.sigmaaldrich.com/catalog/products/sigma/t7140?lang=en&region=US.

R. Mildenberg, et al., "Hydrocarbon Resins", VCH, New York, chapter 5, pp. 141-146 (1997).

* cited by examiner

METHOD OF MANUFACTURING A SELF-SEALING COMPOSITION

FIELD OF THE INVENTION

The present invention relates to self-sealing compositions which can be used as puncture-resistant layers in any type of "inflatable" article, that is to say, by definition, any article which takes its useable shape when inflated with air.

BACKGROUND

It relates more particularly to the processes for the manufacture of self-sealing compositions based on a diene elastomer, such as natural rubber.

For some years, tyre manufacturers have been making particularly great efforts to develop novel solutions to a problem dating from the very beginning of the use of wheels fitted with tyres of inflated type, namely how to allow the vehicle to continue its journey despite a significant or complete loss of pressure from one or more tyres. For decades, the spare wheel was regarded as the sole and universal solution. Then, more recently, the considerable advantages related to its possible removal have become apparent. The concept of "extended mobility" was developed. The associated techniques make it possible to run with the same tyre, according to certain limits to be observed, after a puncture or a fall in pressure. This makes it possible, for example, to drive to a breakdown point without having to halt, under often hazardous conditions, to fit the spare wheel.

Self-sealing compositions capable of making it possible to achieve such an objective, by definition capable of automatically ensuring, that is to say without any external intervention, the airtightness of a tyre in the event of perforation of the latter by a foreign body, such as a nail, are particularly difficult to develop.

In order to be able to be used, a self-sealing layer has to satisfy numerous conditions of a physical and chemical nature. In particular, it has to be effective over a very wide range of operating temperatures, this being the case over the whole of the lifetime of the tyres. It has to be capable of sealing the hole when the perforating article remains in place; when the latter is expelled, it has to be able to fill in the hole and to render the tyre airtight.

Numerous solutions have admittedly been devised but to date it has not really been possible to deploy them in vehicle tyres, in particular due to difficulties in manufacturing these self-sealing compositions and thus to their final cost price.

In particular, high-performance self-sealing compositions, based on natural rubber and on hydrocarbon resin as tackifying agent (or tackifier), have been described in Patents U.S. Pat. No. 4,913,209, U.S. Pat. Nos. 5,085,942 and 5,295,525. These compositions are characterized by the combined presence of a high content of hydrocarbon resin, always greater than 100 parts per 100 parts of solid elastomer (or phr), and of a large amount of elastomer in the liquid state, generally in the form of depolymerized natural rubber (molecular weight typically of between 1000 and 100 000).

First of all, such a high content of resin, apart from the fact that it may be harmful to the hysteresis and consequently to the rolling resistance of the tyres, requires a particularly lengthy and difficult kneading of the elastomer matrix.

The use of a large amount of liquid elastomer admittedly improves the fluidity of the composition but such a use is the cause of other disadvantages, in particular of a risk of the self-sealing composition creeping when used at a relatively high temperature (typically of greater than 60° C.) frequently encountered during the use of some tyres.

Another major manufacturing problem may also arise: in the absence of a reinforcing filler, such as carbon black (furthermore undesirable, in a known way, for this type of application), the composition exhibits weak cohesion. This lack of cohesion may be such that the adhesiveness of the composition, resulting from the high content of tackifying resin employed, is no longer compensated for and prevails. This then results in a risk of undesirable adhesive bonding to the mixing equipment, which is unacceptable under industrial processing conditions.

BRIEF DESCRIPTION OF THE INVENTION

On continuing their research studies, the Applicant Companies have discovered a novel manufacturing process which makes it possible to overcome, or at the very least significantly reduce, the various abovementioned disadvantages.

A subject-matter of the invention is thus a process for the manufacture of a self-sealing elastomer composition comprising at least one diene elastomer, one hydrocarbon resin with a given softening temperature and one liquid plasticizing agent. This process is characterized in that it comprises the following successive stages:
  (a) incorporating the hydrocarbon resin in the diene elastomer by kneading these components in a mixer at a temperature or up to a temperature referred to as "hot compounding" temperature greater than the softening temperature of the hydrocarbon resin, in order to obtain a masterbatch;
  (b) incorporating the liquid plasticizing agent in the masterbatch by kneading the combined mixture in the same mixer or in a different mixer, in order to obtain the self-sealing composition; and
  (c) forming the said self-sealing composition dimensionally.

Such a process has proven to be particularly well suited to the rapid manufacture, under processing conditions acceptable from the industrial viewpoint, of a high-performance self-sealing composition based on diene elastomer and hydrocarbon resin, it being possible for this composition to comprise high contents of hydrocarbon resin without requiring the use of a liquid plasticizing agent at a particularly high content.

BRIEF DESCRIPTION OF THE DRAWINGS

The invention and its advantages will be easily understood in the light of the description and implementational examples which follow, and of the following appended figures which give a simple diagrammatic representation, without observing a specific scale.

I. DETAILED DESCRIPTION OF THE INVENTION

I-1. Definitions

Figure 1:
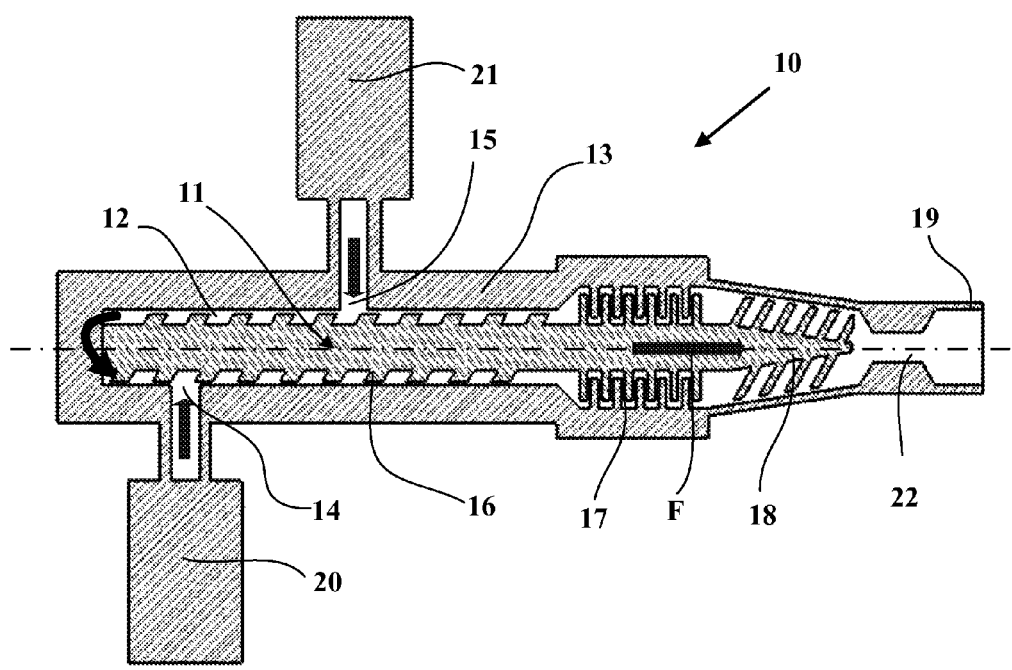
FIG. 1 exhibits an extrusion-mixing device which can be used for the implementation of a first part of a process in accordance with the invention.

In the present description, unless expressly indicated otherwise, all the percentages (%) indicated are % by weight.

Furthermore, any interval of values denoted by the expression "between a and b" represents the range of values greater than "a" and lower than "b" (that is to say, limits a and b excluded), whereas any interval of values denoted by the expression "from a to b" means the range of values ranging from "a" up to "b" (that is to say, including the strict limits a and b).

The abbreviation "phr" means parts by weight per hundred parts of elastomer in the solid state (of the total of the solid elastomers, if several solid elastomers are present).

The expression composition "based on" should be understood as meaning, generally, a composition comprising the mixture and/or the reaction product of its various components, it being possible for some of these components to be capable of reacting (indeed even intended to react) with one another, at least in part, during the various phases of manufacture of the composition, for example during its possible final crosslinking or vulcanization (curing).

Elastomer (or "rubber", the two being regarded as synonyms) of the "diene" type should be understood as meaning, in a known way, an elastomer resulting at least in part (i.e., a homopolymer or a copolymer) from diene monomers (i.e., from monomers carrying two carbon-carbon double bonds, whether conjugated or nonconjugated).

These diene elastomers can be classified into two categories, saturated or unsaturated. In the present patent application, "unsaturated" diene elastomer is understood to mean a diene elastomer resulting at least in part from conjugated diene monomers and having a content of units resulting from conjugated dienes which is greater than 30% (mol %). Thus it is that diene elastomers such as butyl rubbers or copolymers of dienes and of α-olefins of EPDM type, which can be described as "saturated" diene elastomers due to their reduced content of units of diene origin (always less than 15 mol %), are excluded from the preceding definition. The commonest diene elastomers of the unsaturated type are those selected from the group consisting of polybutadienes, natural rubber, synthetic polyisoprenes, butadiene copolymers, isoprene copolymers and the mixtures of such elastomers.

I-2. Measurements

I-2-A. Mooney Viscosity

The Mooney viscosity or plasticity characterizes, in a known way, solid substances. Use is made of an oscillating consistometer as described in Standard ASTM D1646 (1999). The Mooney plasticity measurement is carried out according to the following principle: the sample, analysed in the raw state (i.e., before curing), is moulded (formed) in a cylindrical chamber heated to a given temperature (for example 35° C. or 100° C.). After preheating for one minute, the rotor rotates within the test specimen at 2 revolutions/minute and the working torque for maintaining this movement is measured after rotating for 4 minutes. The Mooney viscosity (ML 1+4) is expressed in "Mooney unit" (MU, with 1 MU=0.83 newton.metre).

I-2-B. Brookfield Viscosity

The Brookfield viscosity characterizes, in a known way, liquid substances. The apparent viscosity according to the Brookfield method is measured at a given temperature (for example at 65° C.) according to European and International Standard EN ISO 2555 (1999). Use is made, for example, of a viscometer of the A type (for example RVT model) or of the B type (for example HAT model) at a rotational frequency preferably equal to 10 or 20 $min^{-1}$, with a No. of the spindle (1 to 7) suitable for the viscosity range measured (according to Appendix A of Standard EN ISO 2555).

I-2-C. Macrostructure of the Elastomers

The macrostructure (Mw, Mn and PI) and the distribution of the molar masses of an elastomer, whether in the liquid state or in the solid state, are characteristics known to a person skilled in the art, available in particular from the suppliers of elastomers, which can furthermore be measured by conventional techniques, such as GPC (Gel Permeation Chromatography) or SEC (Size Exclusion Chromatography).

To recapitulate, the SEC analysis, for example, consists in separating the macromolecules in solution according to their size through columns filled with a porous gel; the molecules are separated according to their hydrodynamic volume, the bulkiest being eluted first. The sample to be analysed is simply dissolved beforehand in an appropriate solvent, for example tetrahydrofuran, at a concentration of 1 g/litre. The solution is then filtered through a filter, for example with a porosity of 0.45 μm, before injection into the apparatus. The apparatus used is, for example, a "Waters Alliance" chromatographic line. The elution solvent is, for example, tetrahydrofuran, the flow rate is 0.7 ml/min and the temperature of the system is 35° C. A set of 4 "Waters" columns in series (names "Styragel HMW7", "Styragel HMW6E" and two "Styragel HT6E") is, for example, used. The injected volume of the solution of the polymer sample is, for example, 100 μl. The detector is a differential refractometer (for example "Waters 2410") which can be equipped with associated software for making use of the data (for example "Waters Millennium"). A Moore calibration is carried out with a series of commercial polystyrene standards having a low PI (less than 1.2), with known molar masses, covering the range of masses to be analysed. The weight-average molar mass (Mw), the number-average molar mass (Mn) and the polydispersity index (PI=Mw/Mn) are deduced from the data recorded (curve of distribution by mass of the molar masses).

I-2-D. Macrostructure of the Hydrocarbon Resins

The macrostructure (Mw, Mn and PI) is determined by SEC as indicated above for the elastomers: solvent tetrahydrofuran, temperature 35° C., concentration 1 g/litre, flow rate 1 ml/min, solution filtered through a filter with a porosity of 0.45 μm before injection (100 μl); Moore calibration with polystyrene standards; set of 3 "Waters" columns in series ("Styragel HR4E", "Styragel HR1" and "Styragel HR 0.5"), detection by differential refractometer (for example "Waters 2410") which can be equipped with operating software (for example "Waters Millennium").

All the values for molar masses shown in the present application are thus relative to calibration curves produced with polystyrene standards. All the values for glass transition temperature ("Tg") are measured in a known way by DSC (Differential Scanning calorimetry) according to Standard ASTM D3418 (1999).

I-3. Process of the Invention

The process according to the invention is thus characterized in that it comprises the following successive stages:
- (a) incorporating the hydrocarbon resin in the diene elastomer by kneading these components in a mixer at a temperature or up to a temperature referred to as "hot compounding" temperature greater than the softening temperature of the hydrocarbon resin, in order to obtain a masterbatch;
- (b) incorporating the liquid plasticizing agent in the masterbatch by kneading the combined mixture in the same mixer or in a different mixer, in order to obtain the self-sealing composition; and
- (c) forming the said self-sealing composition dimensionally.

The final self-sealing composition can be formed in the form of a semi-finished product, that is to say of a layer, of a strip or of a profiled element capable of being used directly in the assembling of a tyre blank or also in the form of a band which can subsequently be reused in an extrusion device.

The above temperature is, of course, that of the masterbatch, measurable in situ, and not the set temperatures of the mixers themselves.

The term "masterbatch" should be understood here as meaning the mixture of at least one diene elastomer and one hydrocarbon resin, which mixture is a precursor of the final self-sealing composition, ready for use.

Various additives, whether intended for the masterbatch proper (for example a stabilizing agent, a colouring agent, a UV stabilizer, an antioxidant, and the like) or for the final self-sealing composition for which the masterbatch is intended, can optionally be incorporated in the masterbatch.

The masterbatch can be manufactured in any compounding device, in particular in a blade mixer, an open mill, an extruder or any mixer capable of sufficiently mixing or kneading its various components until a homogeneous intimate mixture of the said components is obtained. Use is preferably made of a compounding screw extruder, with or without a constant pitch, capable in a known way of introducing significant shearing of the mixture (diene elastomer and resin) being formed.

In the initial state, that is to say before its contact with the elastomer, the hydrocarbon resin can be in the solid state or in the liquid state. During the contacting of the diene elastomer (solid) and the hydrocarbon resin, the latter can be in the solid state or, according to a more preferred embodiment, already in the liquid state; it is sufficient for this to heat the resin to a temperature greater than its softening temperature.

Depending on the type of hydrocarbon resin used, the hot compounding temperature is typically greater than 70° C., preferably greater than 80° C., for example between 100° C. and 150° C.

For optimum compounding of the masterbatch, the hydrocarbon resin is preferably injected in the liquid state, under pressure, into the mixer. According to another preferred embodiment, combined or not combined with the preceding embodiment, the hot compounding stage (a) is carried out with the exclusion of oxygen.

The injection under pressure of the liquid resin, at a temperature at which it is completely molten, has the advantage of introducing, into the compounding chamber of the compounding screw extruder, a degassed resin which is more stable mechanically and chemically.

According to an essential characteristic of the process in accordance with the invention, all or the majority by weight (that is to say, more than 50% by weight) of the liquid plasticizing agent is incorporated in the masterbatch after the end of the optimum compounding of the unsaturated diene elastomer and the hydrocarbon resin.

For this incorporation, it is advantageous to use a compounding screw extruder into which the masterbatch and then the liquid plasticizing agent are introduced. This compounding extruder is equipped with a zone in which high shear is applied and which thus makes possible good homogenization of the mixture. The mixture, after having passed through this zone, corresponds to the final self-sealing composition.

The compounding screw extruder is advantageously equipped with a die having dimensions suited to the subsequent use expected for the composition.

This makes it possible to carry out, with the same device, the final two stages of preparation of the self-sealing composition.

The self-sealing composition can optionally comprise a crosslinking agent. During an additional stage of the process between stage (a) and stage (b), the crosslinking agent, preferably in its entirety or for at least 50% by weight of the latter, is incorporated in the masterbatch, everything being mixed in the same mixer or in a different mixer.

The additional stage of incorporation of the crosslinking agent can be carried out on an external mixer of the two-roll open mill type.

It is then advantageous to carry out this incorporation at a temperature of the masterbatch which is below the softening temperature of the resin. This makes it possible to prevent excessive adhesive bonding of the masterbatch to the rolls of the device. Thus, depending on the type of hydrocarbon resin used, the compounding temperature of the additional stage is preferably below 50° C., more preferably between 20° C. and 40° C. (for example between 20° C. and 30° C.).

If necessary, an intermediate stage of cooling the masterbatch, in order to bring its temperature to a value of less than 100° C., preferably of less than 80° C., in particular of less than the softening temperature of the resin, this being done before introducing the crosslinking agent into the masterbatch prepared previously, can be inserted between the stage (a) and the additional stage described above.

It is also possible to successively carry out stages (a) to (c) of the manufacture of the self-sealing composition with just one device, a compounding screw extruder equipped with the means for introducing and metering the various constituents positioned in offset fashion along the compounding chamber, with appropriate homogenization zones and with a die suitable for the subsequent use of the composition.

I-4. Formulation of the Self-Sealing Composition

The self-sealing composition or material capable of being prepared according to the process of the invention is thus an elastomer composition comprising at least one diene elastomer, one hydrocarbon resin and one liquid plasticizing agent; in addition to various optional additives, it may or may not comprise a crosslinking agent and/or a small fraction of reinforcing filler. Its formulation is described in more detail below.

a) Diene Elastomer

The diene elastomers, in a known way, can be classified in two categories, saturated or unsaturated. Use is preferably made here of a diene elastomer of the unsaturated type, that is to say, by definition, a diene elastomer resulting at least in part from conjugated diene monomers and having a content of units resulting from conjugated dienes which is greater than 30% (mol %).

In contrast to liquid, solid is understood to mean any substance which does not have the ability to eventually assume, at the latest after 24 hours, under the effect of gravity alone and at ambient temperature (23° C.), the shape of the container in which it is present.

In contrast to elastomers of the liquid type which can optionally be used as liquid plasticizing agents in the composition of the invention, the diene elastomer or elastomers of the self-sealing composition are by definition solids, that is to say have a very high viscosity: their Mooney viscosity in the raw (i.e. non-crosslinked) state ML (1+4), measured at 100° C., is preferably greater than 20, more preferably greater than 30 and in particular between 30 and 130.

According to another possible definition, solid elastomer is also understood to mean an elastomer having a high molar mass, that is to say typically exhibiting a number-average molar mass (Mn) which is greater than 100 000 g/mol; preferably, in such a solid elastomer, at least 80%, more preferably at least 90%, of the area of the distribution of the molar masses (measured by SEC) lies above 100 000 g/mol.

Typically, the number-average molar mass (Mn) of the diene elastomer or elastomers is between 100 000 and 5 000 000 g/mol and more particularly between 200 000 and 4 000 000 g/mol.

More preferably, the diene elastomer (which is preferably unsaturated) is selected from the group consisting of polybutadienes (BRs), natural rubber (NR), synthetic polyisoprenes (IRs), butadiene copolymers (for example butadiene/styrene copolymers or SBRs), isoprene copolymers and the mixtures of such elastomers.

More preferably still, the unsaturated diene elastomer of the composition of the invention is an isoprene elastomer, preferably selected from the group consisting of natural rubber (NR), synthetic polyisoprenes (IRs), butadiene/isoprene copolymers (BIRs), styrene/isoprene copolymers (SIRs), styrene/butadiene/isoprene copolymers (SBIRs) and the mixtures of these elastomers. This isoprene elastomer is preferably natural rubber or a synthetic cis-1,4-polyisoprene.

The above unsaturated diene elastomer, in particular an isoprene elastomer, such as natural rubber, can constitute all of the elastomer matrix or the majority by weight (preferably for more than 50%, more preferably for more than 70%) of the latter when it comprises one or more other diene or nondiene elastomers, for example of the thermoplastic type. In other words and preferably, in the composition of the invention, the content of (solid) unsaturated diene elastomer, in particular of isoprene elastomer, such as natural rubber, is greater than 50 phr, more preferably greater than 70 phr. More preferably still, this content of unsaturated diene elastomer, in particular of isoprene elastomer, such as natural rubber, is greater than 80 phr.

According to a specific embodiment, the above unsaturated diene elastomer, in particular when it is an isoprene diene elastomer, such as natural rubber, is the only elastomer present in the self-sealing composition of the invention. However, according to other possible embodiments, this isoprene elastomer might be combined with other (solid) elastomers in minor amounts by weight, whether unsaturated diene elastomers (for example BR or SBR), indeed even saturated diene elastomers (for example butyl), or else elastomers other than diene elastomers, for example thermoplastic styrene (TPS) elastomers, for example selected from the group consisting of styrene/butadiene/styrene (SBS), styrene/isoprene/styrene (SIS), styrene/butadiene/isoprene/styrene (SBIS), styrene/isobutylene/styrene (SIBS), styrene/ethylene/butylene/styrene (SEBS), styrene/ethylene/propylene/styrene (SEPS) and styrene/ethylene/propylene/styrene (SEEPS) block copolymers and the mixtures of these copolymers.

According to another preferred embodiment, the diene elastomers of the self-sealing composition are a blend of at least two solid elastomers, a polybutadiene or butadiene copolymer elastomer, "elastomer A", and a natural rubber or synthetic polyisoprene elastomer, "elastomer B", the elastomer A:elastomer B ratio by weight being within a range from 10:90 to 90:10.

b) Hydrocarbon Resin

The designation "resin" is reserved in the present patent application, by definition known to a person skilled in the art, for a compound which is solid at ambient temperature (23° C.), in contrast to a liquid plasticizing compound, such as an oil.

Hydrocarbon resins are polymers well known to a person skilled in the art, essentially based on carbon and hydrogen, which can be used in particular as plasticizing agents or tackifying agents in polymer matrices. They are by nature miscible (i.e., compatible) at the contents used with the polymer compositions for which they are intended, so as to act as true diluents. They have been described, for example, in the work entitled "*Hydrocarbon Resins*" by R. Mildenberg, M. Zander and G. Collin (New York, VCH, 1997, ISBN 3-527-28617-9), Chapter 5 of which is devoted to their applications, in particular in the tyre rubber field (5.5. "*Rubber Tires and Mechanical Goods*"). They can be aliphatic, cycloaliphatic, aromatic, hydrogenated aromatic, of the aliphatic/aromatic type, that is to say based on aliphatic and/or aromatic monomers. They can be natural or synthetic and may or may not be oil-based (if such is the case, they are also known under the name of petroleum resins). Their glass transition temperature (Tg) is preferably greater than 0° C., in particular greater than 20° C. (generally between 30° C. and 95° C.).

In a known way, these hydrocarbon resins can also be described as thermoplastic resins in the sense that they soften on heating and can thus be moulded. They can also be defined by a softening point or temperature, at which temperature the product, for example in the powder form, sticks together; this datum tends to replace the melting point, which is rather poorly defined, for resins in general. The softening temperature of a hydrocarbon resin is generally greater by approximately 50 to 60° C. than the Tg value.

In the composition of the invention, the softening temperature of the resin is preferably greater than 40° C. (in particular between 40° C. and 140° C.), more preferably greater than 50° C. (in particular between 50° C. and 135° C.).

The said resin is preferably used at a content by weight of greater than 30 phr and very preferably of between 30 and 90 phr. Below 30 phr, the puncture-resistant performance may prove to be inadequate due to an excessively high stiffness of the composition. Above 90 phr, possible exposure exists to an inadequate mechanical strength of the material with in addition a risk of a damaged performance at high temperature (typically greater than 60° C.). For all these reasons, the resin content is preferably between 40 and 80 phr, more preferably still at least equal to 45 phr, in particular within a range from 45 to 75 phr.

According to a preferred embodiment of the invention, the hydrocarbon resin exhibits at least (any) one, more preferably all, of the following characteristics:

a Tg of greater than 25° C.;
a softening point of greater than 50° C. (in particular of between 50° C. and 135° C.);

a number-average molar mass (Mn) of between 400 and 2000 g/mol;

a polydispersity index (PI) of less than 3 (reminder: PI=Mw/Mn with Mw the weight-average molar mass).

More preferably, this hydrocarbon resin exhibits at least (any) one, more preferably all, of the following characteristics:

a Tg of between 25° C. and 100° C. (in particular between 30° C. and 90° C.);

a softening point of greater than 60° C., in particular of between 60° C. and 135° C.;

a number-average molar mass Mn of between 500 and 1500 g/mol;

a polydispersity index PI of less than 2.

The softening point is measured according to Standard ISO 4625 ("Ring and Ball" method). The macrostructure (Mw, Mn and PI) is determined by steric exclusion chromatography (SEC) as indicated in the introduction to the patent application.

Mention may be made, as examples of such hydrocarbon resins, of those selected from the group consisting of cyclopentadiene (abbreviated to CPD) or dicyclopentadiene (abbreviated to DCPD) homopolymer or copolymer resins, terpene homopolymer or copolymer resins, $C_5$ fraction homopolymer or copolymer resins, and the mixtures of these resins. Mention may more particularly be made, among the above copolymer resins, of those selected from the group consisting of (D)CPD/vinylaromatic copolymer resins, (D)CPD/terpene copolymer resins, (D)CPD/$C_5$ fraction copolymer resins, terpene/vinylaromatic copolymer resins, $C_5$ fraction/vinylaromatic copolymer resins, and the mixtures of these resins.

The term "terpene" combines here, in a known way, α-pinene, β-pinene and limonene monomers; use is preferably made of a limonene monomer, a compound which exists, in a known way, in the form of three possible isomers: L-limonene (laevorotatory enantiomer), D-limonene (dextrorotatory enantiomer) or else dipentene, the racemate of the dextrorotatory and laevorotatory enantiomers. Suitable as vinylaromatic monomer are, for example, styrene, α-methylstyrene, ortho-methylstyrene, meta-methylstyrene, para-methylstyrene, vinyltoluene, para-(tert-butyl)styrene, methoxystyrenes, chlorostyrenes, hydroxystyrenes, vinylmesitylene, divinylbenzene, vinylnaphthalene or any vinylaromatic monomer resulting from a $C_9$ fraction (or more generally from a $C_8$ to $C_{10}$ fraction).

More particularly, mention may be made of the resins selected from the group consisting of (D)CPD homopolymer resins, (D)CPD/styrene copolymer resins, polylimonene resins, limonene/styrene copolymer resins, limonene/D(CPD) copolymer resins, $C_5$ fraction/styrene copolymer resins, $C_5$ fraction/$C_9$ fraction copolymer resins and the mixtures of these resins.

All the above resins are well known to a person skilled in the art and are commercially available, for example sold by DRT under the name "Dercolyte" as regards the polylimonene resins, by Neville Chemical Company under the name "Super Nevtac" or by Kolon under the name "Hikorez" as regards the $C_5$ fraction/styrene resins or $C_5$ fraction/$C_9$ fraction resins, or by Struktol under the name "40 MS" or "40 NS" or by Exxon Mobil under the name "Escorez" (mixtures of aromatic and/or aliphatic resins).

c) Liquid Plasticizing Agent

The self-sealing composition additionally comprises, preferably at a content of less than 60 phr (in other words, between 0 and 60 phr), a liquid plasticizing agent (liquid at 23° C.), referred to as "low Tg" plasticizing agent, the role of which is in particular to soften the matrix by diluting the diene elastomer and the hydrocarbon resin, improving in particular the "cold" self-sealing performance (that is to say, typically for a temperature of less than 0° C.); its Tg is by definition less than −20° C. and is preferably less than −40° C.

Any liquid elastomer or any extending oil, whether of aromatic or nonaromatic nature, more generally any liquid plasticizing agent known for its plasticizing properties with respect to elastomers, in particular diene elastomers, can be used in the self-sealing composition of the process in accordance with the invention. At ambient temperature (23° C.), these plasticizing agents or these oils, which are more or less viscous, are liquids, in contrast in particular to hydrocarbon resins, which are by nature solid at ambient temperature.

To recapitulate, in contrast to a solid, liquid should be understood as meaning a substance having the ability to eventually assume, at the latest after 24 hours, solely under the effect of gravity and at ambient temperature (23° C.), the shape of the container in which it is present.

In contrast to solid elastomers, liquid plasticizing agents and elastomers (i.e., having a low molecular weight) are characterized by a very low viscosity: preferably, their Brookfield viscosity, measured at 65° C., is less than 2 000 000 cP (cP meaning centipoise; 1 cP is equal to 1 mPa·s), more preferably less than 1 500 000 cP, more preferably still between 200 and 1 000 000 cP (typically between 2000 and 1 000 000 cP as regards liquid elastomers).

According to another possible definition, liquid elastomer is also understood to mean an elastomer for which the number-average molar mass (Mn) is less than 100 000 g/mol; preferably, in such a liquid elastomer, at least 80% and more preferably at least 90% of the area of the distribution of the molar masses (measured by SEC) is situated below 100 000 g/mol.

Suitable in particular are liquid elastomers for which the number-average molar mass (Mn) is between 400 and 90 000 g/mol, more generally between 800 and 90 000 g/mol, for example in the form of liquid BR, liquid SBR, liquid IR or liquid depolymerized natural rubber, such as are described, for example, in the abovementioned patent documents U.S. Pat. No. 4,913,209, U.S. Pat. No. 5,085,942 and U.S. Pat. No. 5,295,525. If a liquid diene elastomer (for example liquid NR, liquid IR or liquid BR) is used as plasticizing agent, it can optionally be generated in situ, that is to say during the actual manufacture of the composition of the invention, for example by an appropriate (thermo)mechanical working (depolymerization by chain breakage) of the starting solid elastomers. Use may also be made of mixtures of such liquid elastomers with oils, such as described below.

Extending oils, in particular those selected from the group consisting of polyolefin oils (that is to say, resulting from the polymerization of olefins, monoolefins or diolefins), paraffinic oils, naphthenic oils (of low or high viscosity and hydrogenated or nonhydrogenated), aromatic or DAE (Distillate Aromatic Extracts) oils, MES (Medium Extracted Solvates) oils, TDAE (Treated Distillate Aromatic Extracts) oils, mineral oils, vegetable oils (and their oligomers, e.g., palm, rapeseed, soybean or sunflower oils) and the mixtures of these oils, are also suitable.

According to a specific embodiment, use is made, for example, of an oil of the polybutene type, in particular a polyisobutylene (abbreviated to "PIB") oil, which has demonstrated an excellent compromise in properties in comparison with the other oils tested, in particular with a conventional oil of the paraffinic type. By way of examples, PIB oils are sold in particular by Univar under the name "Dynapak Poly" (e.g. "Dynapak Poly 190") and by BASF under the name "Glissopal" (e.g. "Glissopal 1000") or "Oppanol" (e.g. "Oppanol B12") names; paraffinic oils are sold, for example, by Exxon under the name "Telura 618" or by Repsol under the name "Extensol 51".

Also suitable as liquid plasticizing agents are ether, ester, phosphate or sulphonate plasticizing agents, more particularly those selected from esters and phosphates. Mention may be made, as preferred phosphate plasticizing agents, of those which comprise between 12 and 30 carbon atoms, for example trioctyl phosphate. Mention may in particular be made, as preferred ester plasticizing agents, of the compounds selected from the group consisting of trimellitates, pyromellitates, phthalates, 1,2-cyclohexanedicarboxylates, adipates, azelates, sebacates, glycerol triesters and the mixtures of these compounds. Mention may be made, among the above triesters, as preferred glycerol triesters, of those which are composed predominantly (for more than 50% by weight, more preferably for more than 80% by weight) of an unsaturated $C_{18}$ fatty acid, that is to say a fatty acid selected from the group consisting of oleic acid, linoleic acid, linolenic acid and the mixtures of these acids. More preferably, whether of synthetic or natural origin (the case, for example, of sunflower or rapeseed vegetable oils), the fatty acids used is composed, for more than 50% by weight, more preferably still for more than 80% by weight, of oleic acid. Such triesters (trioleates) having a high content of oleic acid are well known—they have been described, for example, in Application WO 02/088238 (or US 2004/0127617)—as plasticizing agents in tyre treads.

The number-average molar mass Mn of the liquid plasticizing agents other than liquid elastomers is preferably between 400 and 25 000 g/mol, more preferably still between 800 and 10 000 g/mol (measured by SEC, as indicated above for the hydrocarbon resin). For excessively low Mn masses, there exists a risk of migration of the plasticizing agent to the outside of the composition, whereas excessively high masses can result in excessive stiffening of this composition. An Mn mass of between 1000 and 4000 g/mol has proved to constitute an excellent compromise for the targeted applications, in particular for use in a tyre.

To sum up, the liquid plasticizing agent is preferably selected from the group consisting of liquid elastomers, polyolefin oils, naphthenic oils, paraffinic oils, DAE oils, MES oils, TDAE oils, mineral oils, vegetable oils, ether plasticizing agents, ester plasticizing agents, phosphate plasticizing agents, sulphonate plasticizing agents and the mixtures of these compounds. More preferably, this liquid plasticizing agent is selected from the group consisting of liquid elastomers, polyolefin oils, vegetable oils and the mixtures of these compounds.

A person skilled in the art will be able, in the light of the description and implementational examples which follow, to adjust the amount of liquid plasticizing agent as a function of the nature of the latter and of the specific conditions of use of the self-sealing composition, in particular of the inflatable article in which it is intended to be used.

Preferably, the content of liquid plasticizing agent is within a range from 5 to 40 phr, more preferably within a range from 10 to 30 phr. Below the minima indicated, there is a risk of the elastomer composition exhibiting a stiffness which is too high for some applications, whereas, above the recommended maxima, a risk arises of insufficient cohesion of the composition and of a deterioration in the self-sealing properties.

d) Crosslinking Agent

According to a preferred embodiment, the self-sealing composition can optionally comprise a crosslinking agent which can be composed of just one or several compounds. This crosslinking agent is preferably a crosslinking agent based on sulphur or on a sulphur donor. In other words, this crosslinking agent is a "vulcanization" agent.

According to a preferred embodiment, the vulcanization agent comprises sulphur and, as vulcanization activator, a guanidine derivative, that is to say a substituted guanidine. Substituted guanidines are well known to a person skilled in the art (see, for example, WO 00/05300): mention will be made, as nonlimiting examples, of N,N'-diphenylguanidine (abbreviated to "DPG"), triphenylguanidine or di(o-tolyl) guanidine. Use is preferably made of DPG.

The sulphur content is, for example, between 0.1 and 1.5 phr, in particular between 0.2 and 1.2 phr (especially between 0.2 and 1.0 phr), and the content of guanidine derivative is itself between 0 and 1.5 phr, in particular between 0 and 1.0 phr (especially in a range from 0.2 to 0.5 phr).

The said system does not require the presence of a vulcanization accelerator. According to a preferred embodiment, the composition can thus be devoid of such an accelerator or at the very most can comprise less than 1 phr thereof, more preferably less than 0.5 phr thereof If such an accelerator is used, mention may be made, as example, of any compound ("primary" or "secondary" accelerator) capable of acting as vulcanization accelerator for diene elastomers in the presence of sulphur, in particular accelerators of the thiazole type and their derivatives, accelerators of the thiuram type, or zinc dithiocarbamates.

According to another advantageous embodiment, the above vulcanization agent can be devoid of zinc or zinc oxide (which are known as vulcanization activators).

According to another possible embodiment of the invention, use may also be made of a sulphur donor in place of sulphur itself Sulphur donors are well known to a person skilled in the art. Mention will in particular be made of thiuram polysulphides selected more preferably from the group consisting of tetrabenzylthiuram disulphide ("TBzTD"), tetramethylthiuram disulphide ("TMTD"), dipentamethylenethiuram tetrasulphide ("DPTT"), and the mixtures of such compounds. Use is more preferably made of TBzTD, particularly at the preferred contents indicated above for a sulphur donor (i.e., between 0.1 and 15 phr, more preferably between 0.5 and 10 phr, especially between 1 and 5 phr).

After curing, a vulcanization agent as described above contributes sufficient cohesion to the composition, without truly vulcanizing it: the crosslinking, which can be measured via a conventional swelling method known to a person skilled in the art, is in fact close to the detection threshold.

e) Filler

The composition prepared according to the process of the invention has the other characteristic of not comprising a filler or comprising a very small amount of filler, that is to say of comprising from 0 to less than 30 phr of at least one (that is to say, one or more) such optional filler.

Filler is understood here to mean any type of filler, whether reinforcing (typically having nanometric particles, with a weight-average size preferably of less than 500 nm, in particular between 20 and 200 nm) or nonreinforcing or inert (typically having micrometric particles, with a weight-average size of greater than 1 μm, for example between 2 and 200 μm).

These reinforcing or nonreinforcing fillers are essentially only present to give dimensional stability, that is to say a minimum mechanical strength, to the final composition. Less thereof is preferably placed in the composition in proportion as the filler is known to be reinforcing with respect to an elastomer, in particular an isoprene elastomer, such as natural rubber.

An excessively high amount, in particular of greater than 30 phr, no longer makes it possible to achieve the minimum required properties of flexibility, deformability and ability to creep. For these reasons, the self-sealing composition preferably comprises from 0 to less than 20 phr, more preferably from 0 to less than 10 phr, of filler.

Mention will in particular be made, as examples of fillers known as reinforcing to a person skilled in the art, of carbon black nanoparticles or of a reinforcing inorganic filler, or a blend of these two types of filler.

All carbon blacks are suitable as carbon blacks, for example, in particular the blacks conventionally used in tyres ("tyre-grade" blacks). Mention will more particularly be made, among the latter, of carbon blacks of 300, 600, 700 or 900 grade (ASTM) (for example, N326, N330, N347, N375, N683, N772 or N990). Suitable in particular as reinforcing inorganic fillers are mineral fillers of the silica ($SiO_2$) type, in particular precipitated or pyrogenic silicas exhibiting a BET specific surface of less than 450 $m^2/g$, preferably from 30 to 400 $m^2/g$.

Mention will in particular be made, as examples of fillers known as nonreinforcing or inert to a person skilled in the art, of ashes (i.e., combustion residues) or microparticles of natural calcium carbonates (chalk) or synthetic calcium carbonates, of synthetic silicates or natural silicates (such as kaolin, talc, mica), of ground silicas, of titanium oxides, of aluminas or of aluminosilicates. Mention may also be made, as examples of lamellar fillers, of graphite particles. Colouring or coloured fillers can advantageously be used to colour the composition according to the colour desired.

The physical state under which the filler is provided is not important, whether in the form of a powder, microspheres, granules, beads or any other appropriate densified form. Of course, filler is also understood to mean mixtures of different reinforcing and/or nonreinforcing fillers.

A person skilled in the art will be able, in the light of the present description, to adjust the formulation of the self-sealing composition in order to achieve the property levels desired and to adjust the formulation to the specific application envisaged.

According to a specific and advantageous embodiment of the invention, if a filler is present in the composition of the invention, its content is preferably less than 5 phr (i.e., between 0 and 5 phr), in particular less than 2 phr (i.e., between 0 and 2 phr). Such contents have proved to be particularly favourable to the manufacturing process of the invention, while providing the self-sealing composition of the invention with an excellent performance. Use is more preferably made of a content of between 0.5 and 2 phr, in particular when carbon black is concerned.

When a filler such as carbon black is used, it can be introduced during stage (a), that is to say at the same time as the unsaturated diene elastomer and the hydrocarbon resin, or else, when an additional stage is present in order to incorporate a crosslinking agent, according to a preferred embodiment, the filler is introduced during this additional stage.

It has been found that a very small proportion of carbon black, preferably of between 0.5 and 2 phr, further improves the compounding and the manufacture of the composition, as well as its final extrudability.

f) Other Possible Additives

The base constituents described above are sufficient by themselves alone for the self-sealing composition to completely fulfil its puncture-resistant function with regard to the inflatable articles in which it is used. However, various other additives can be added, typically in a small amount (preferably at contents of less than 20 phr, more preferably of less than 15 phr), such as, for example, protection agents, such as UV stabilizers, antioxidants or antiozonants, various other stabilizers, or colouring agents which can advantageously be used for the colouring of the self-sealing composition. In addition to the elastomers described above, the self-sealing composition might also comprise, always according to a minor fraction by weight with respect to the unsaturated diene elastomer, polymers other than elastomers, such as, for example, thermoplastic polymers compatible with the unsaturated diene elastomer.

II. IMPLEMENTIONAL EXAMPLE OF THE INVENTION

II-1. Manufacture of the Self-Sealing Composition

The process for the manufacture of the self-sealing composition is now described, taking as example the manufacture of a composition comprising an optional crosslinking agent. The process thus comprises the additional stage of incorporation of this crosslinking agent.

a) Manufacture in Three Steps

By way of example, stage (a) of manufacture of the masterbatch is preferably carried out in a compounding screw extruder as represented diagrammatically in a simple way in FIG. 1.

This FIG. 1 shows a compounding screw extruder 10 essentially comprising a cylindrical barrel 13 defining a compounding chamber 12 in which an extrusion screw (for example a single screw) 11 is rotated, a first metering pump 20 for the diene elastomer (solid), a second metering pump 21 for the resin (solid) and an outlet die 19 for the masterbatch. The metering pump 20 for the elastomer makes it possible to plasticize the diene elastomer, solid during its introduction, to force feed it, to volumetrically meter it and to introduce it under pressure into the compounding chamber 12 at the point 14. The metering pump 21 for the resin comprises, upstream, means (not represented) for heating the resin in order to bring it to the liquid state under high pressure, which has the advantage of also degassing this liquid resin; it is thus more stable chemically and mechanically. The resin is subsequently introduced in liquid form into the metering pump 21, which volumetrically meters it and injects it under pressure into the compounding chamber 12 at the point 15. The separation of the metering (elastomer, resin) and compounding functions in addition offers better control of the process.

The products, pushed (in the direction of the arrow F) by the rotation of the extrusion screw 11 in the first transfer zone 16, are intimately mixed, in particular in the zone 17, where a "chopper-homogenizer" is positioned which applies very strong shearing to them. A second transfer zone 18 occurs at the outlet of the zone 17, which second zone is intended to force feed the masterbatch 22 in order to make possible the extrusion through the die 19 and thus to obtain a masterbatch having a geometry, such as a band, suitable for the use thereof or the storage thereof.

Figure 2:
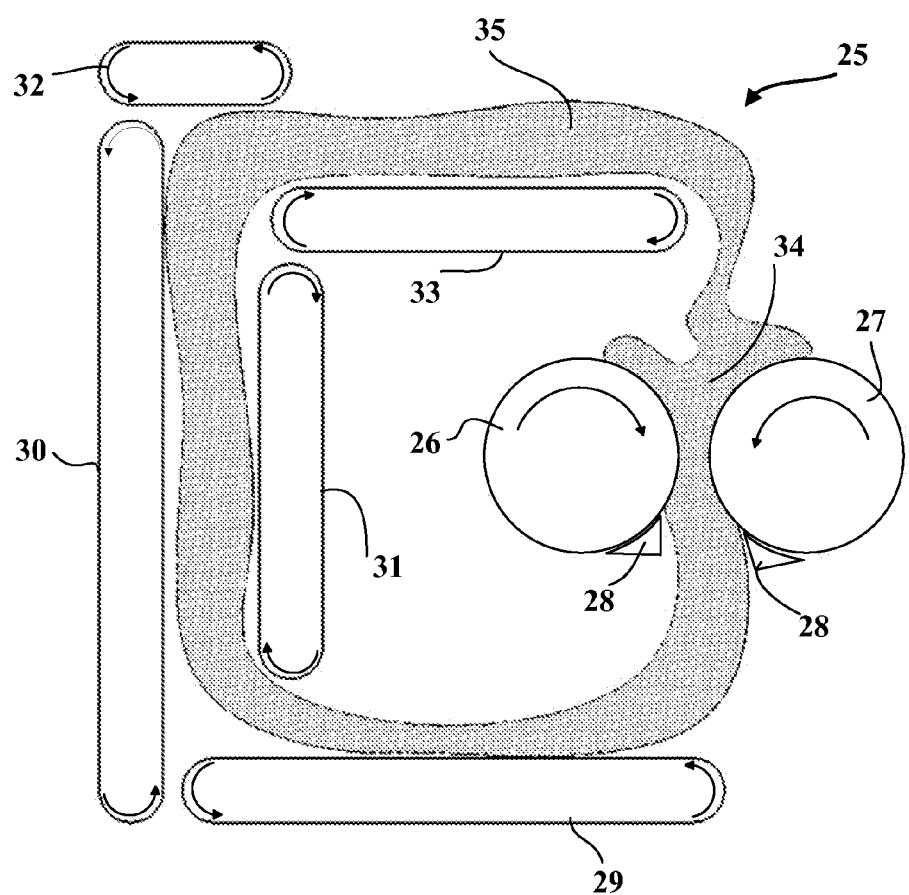
FIG. 2 exhibits an external mixer which can be used for the implementation of another part of a process in accordance with the invention.

The masterbatch thus extruded is subsequently cooled down to a temperature below the softening temperature of the resin and is introduced, for example, onto an external mixer of the two-roll open mill type for introduction of the optional crosslinking agent and of the optional filler. Such an external mixer of the two-roll open mill type 25 is represented diagrammatically in FIG. 2. It comprises two rolls 26 and 27 and belts for conveying the intermediate mixture in order to ensure that the products are satisfactorily introduced and homogenized. The masterbatch is placed above the two rolls and forms a bead 34. The two rolls are rotated with opposite directions of rotation in order to carry the bead downwards. Two scrapers 28 prevent the product from ascending and cause it to fall onto a lower belt 29. This belt carries the product along until it is taken up by the two internal and external vertical belts 31 and 30 respectively. These two belts cause the product to come back above the rolls. The return belt 32 and the upper belt 33 carry it along to a position vertical to the two rolls. The product then falls as far as the bead 34 and again passes between the two rolls 26 and 27. The product thus forms a sheet 35 which ensures excellent incorporation of the products in the masterbatch to give an intermediate mixture, that is to say the masterbatch in which the optional filler and the optional crosslinking agent have been incorporated.

The temperature of the product is preferably kept below the softening temperature of the resin so as to prevent any undesirable adhesive bonding of the composition to the walls of the rolls of the mixer.

It is possible to directly form the masterbatch at the outlet of the extrusion device 10 in order to make it easier to transport it and/or to place it on the external mixer 25. It is also possible to use continuous feeding of the external mixer of the two-roll open mill type.

Figure 3:
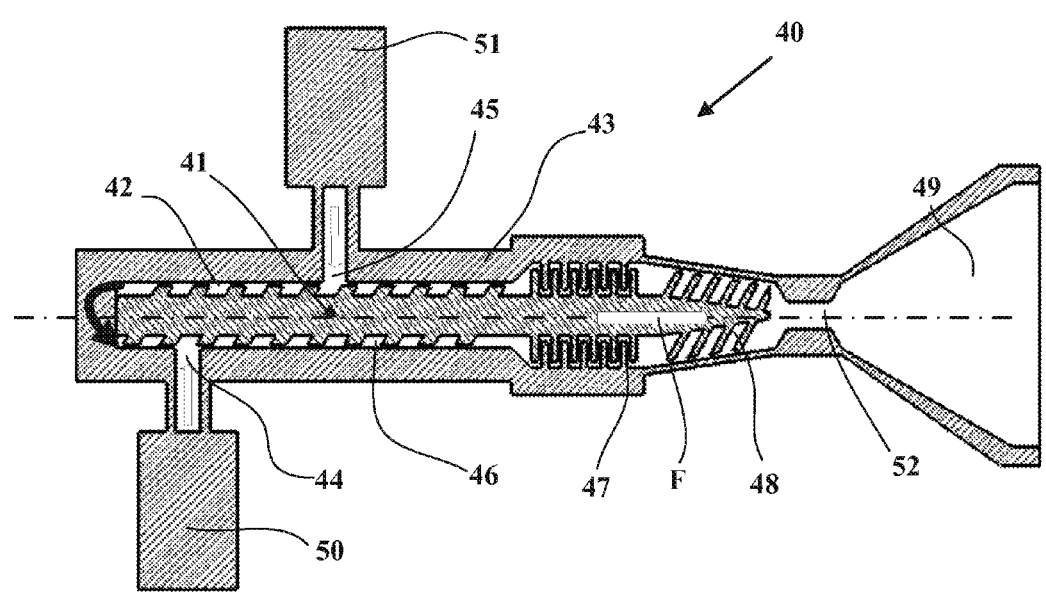
FIG. 3 exhibits an extrusion-mixing device which can be used for the implementation of another part of a process in accordance with the invention.

When the incorporation is complete, the sheet is cut up and the intermediate product is stored in the form of blocks of rubber, for example before being reintroduced into a second compounding screw extruder as presented in FIG. 3 for example.

It is also possible, when the optional crosslinking agent and the optional filler are incorporated in the masterbatch to give an intermediate mixture, not to cut up the sheet 34 but to introduce the liquid plasticizing agent of stage (b), still on the external mixer of the two-roll open mill type.

The intermediate mixture is preferably introduced into a second compounding screw extruder 40 as illustrated in FIG. 3. This second compounding screw extruder 40 is very similar to the first 10. It comprises a barrel 43 which defines a compounding chamber 42 in which a screw 41 is rotated. A metering pump 50 makes it possible to meter out the intermediate mixture or composition and to inject it under pressure into the compounding chamber 42 at the point 44. A second metering pump 51 makes it possible to meter out the liquid plasticizing agent and to introduce it under pressure into the compounding chamber at the point 45. Intimate mixing of the constituents is provided during the transfer of the constituents in the zone 42 and particularly by the chopper-homogenizer of the zone 47. Then, at the outlet of the zone 47, the transfer zone 48 of the screw 41 force feeds and pressurizes the final self-sealing composition 52 in order to allow it to be extruded through the die 49, stage (c) of the process in accordance with the invention. The die 49 has dimensions suitable for producing a semi-finished product suited to the use of the final self-sealing composition.

The semi-finished product is then appropriately conditioned for the use thereof.

It should be noted that, after the incorporation of the liquid plasticizing agent, the final self-sealing composition exhibits a very tacky nature which makes it difficult to handle. It is this which explains the whole advantage of carrying out the two stages (b) and (c) in a single step as described above, using the compounding screw extruder 40.

By virtue of the preferred device and the preferred process described above, it is possible to prepare a self-sealing composition under satisfactory industrial conditions, without the risk of contaminating the equipment due to undesirable adhesive bonding of the composition to the walls of the mixers.

b) Manufacture in a Single Step

Figure 4:
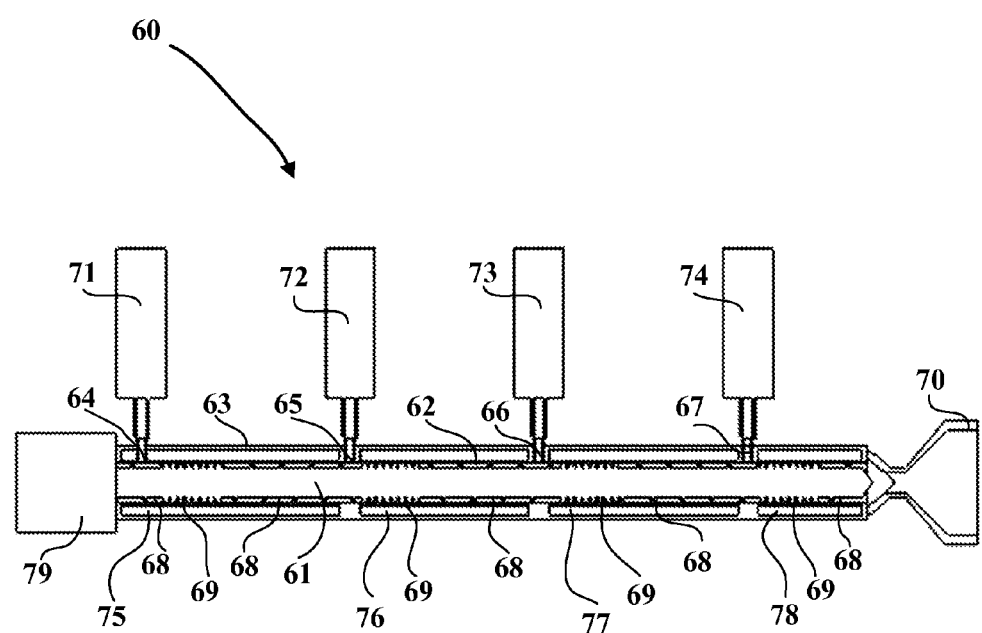
FIG. 4 exhibits a device which makes it possible to carry out all of the stages of a process in accordance with the invention.

An alternative device for carrying out the process in accordance with the invention is illustrated diagrammatically in FIG. 4.

This device 60 is a compounding screw extruder comprising a barrel 63, a compounding chamber 62 and an extrusion screw 61 rotated in the compounding chamber by the motor 79. This device comprises four metering pumps 71, 72, 73 and 74 for the introduction of the four main constituents of the self-sealing composition.

The metering pump 71 introduces the plasticized and metered diene elastomer under pressure at the point 64, the metering pump 72 introduces the dosed and degassed liquid resin at the point 65, the metering pump 73 introduces the optional crosslinking agent and the optional filler under the same conditions at the point 66 and the metering pump 74 introduces the metered liquid plasticizing agent under pressure at the point 67. The four points 64, 65, 66 and 67 are offset with respect to one another from the upstream to the downstream of the device.

The screw 61 comprises, as above, zones 68 for transfer of the products and also choppers-homogenizers 69 for vigorously shearing the products and ensuring that the constituents have been homogenized. In the example presented, a first zone 69 is positioned between the inlet points of the elastomer and of the resin. The aim of this zone is to complete the plasticizing of the elastomer before the incorporation of the resin. Three similar zones 69 are subsequently found, each positioned downstream of a feed point of a constituent.

The barrel is also equipped with four thermal regulation zones 75, 76, 77 and 78 for keeping the temperature of the product in the compounding chamber within the required temperature ranges.

The device is equipped with a die 70 similar to the die 49 of the device 40.

This device 60 makes it possible to obtain, in a single step and very rapidly, a final self-sealing composition ready to be used for the preparation of a tyre.

In the case where the self-sealing composition comprises more than one diene elastomer, for example a 50/50 mixture of natural rubber and polybutadiene, the device 60 is advantageously provided with two identical metering pumps 71 with inlet points in the compounding chamber which are slightly offset.

A similar device is, by way of example, described in the document EP 0 605 781 B1 of the Applicant Companies.

II-2. Use of the Self-Sealing Composition as Puncture-Resistant Layer

The self-sealing composition or material prepared according to the process of the invention is a solid compound which is characterized in particular, by virtue of its specific formulation, by very great flexibility and high deformability. Its Mooney viscosity, measured at 35° C. in the raw state (i.e., before curing), is preferably greater than 20, more preferably between 20 and 80, according to its specific formulation and the application targeted.

It can be used as puncture-resistant layer in any type of "inflatable" article, that is to say, by definition, any article which takes its useable form when inflated with air. Mention may be made, as examples of such inflatable articles, of inflatable boats, or balls used for play or sport.

It is particularly well suited to use as puncture-resistant layer in an inflatable article, a finished or semi-finished product, made of rubber, in particular in tyres for a motor vehicle, such as vehicles of the two-wheel, passenger or industrial type, or a vehicle other than a motor vehicle, such as a bicycle, more particularly in tyres for passenger vehicles capable of running at very high speed or tyres for industrial vehicles, such as heavy-duty vehicles, capable of running and operating under particularly high internal temperature conditions.

Such a puncture-resistant layer is preferably positioned on the internal wall of the inflatable article, completely or at least partially covering it, but it can also be completely incorporated into its internal structure.

The self-sealing composition described here, in particular produced with the process in accordance with the invention, has the advantage of exhibiting, within a very wide operating temperature range for the tyres, virtually no disadvantage in terms of rolling resistance in comparison with a tyre not comprising such a self-sealing layer. In addition, in comparison with normal self-sealing compositions, the risks of excessive creep during use at relatively high temperature (typically greater than 60° C.), a temperature frequently encountered during the use of some tyres, are notably reduced; its self-sealing properties are also improved during use at low temperature (typically less than 0° C.); it is also noted that the rate of sealing of a hole, in particular when there is a delay in removing a perforating article, is also improved.

The latter situation is very common. This is because, during a puncture, the nail or piercing object responsible very often remains jammed in the structure of the tyre for several hundred kilometres, indeed even several thousand kilometres.

Figure 5:
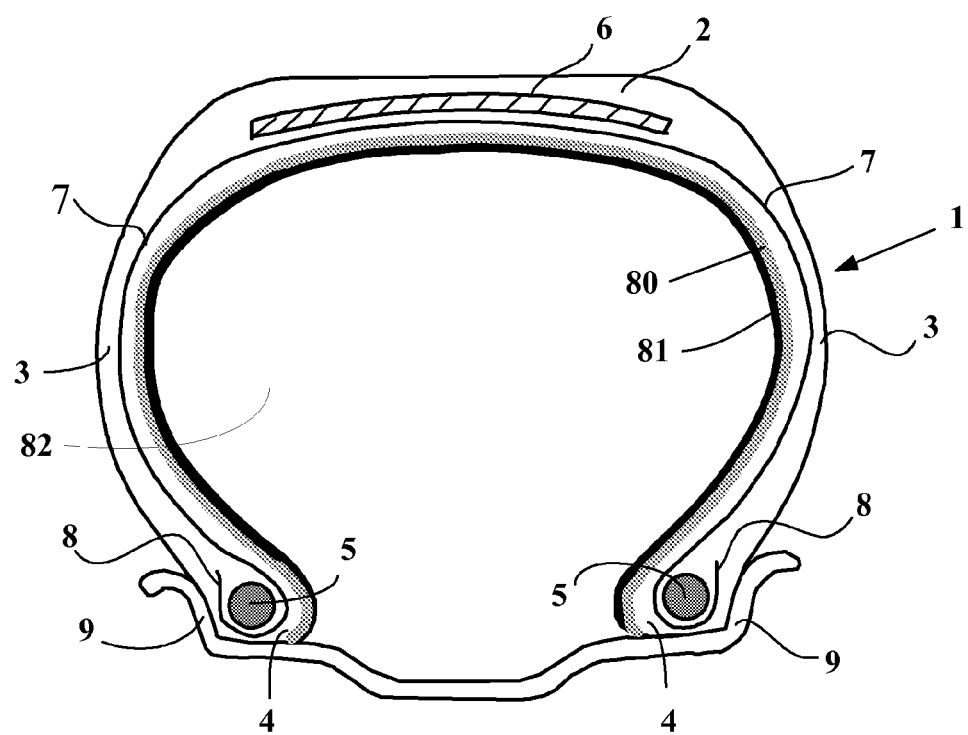
FIG. 5 illustrates, in radial cross section, an example of a tyre using a self-sealing composition prepared according to the process in accordance with the invention.

By way of example, the appended FIG. 5 represents, highly schematically (without observing a specific scale), a radial cross section of a tyre using a self-sealing composition prepared according to the process in accordance with the invention.

This tyre 1 comprises a crown 2 reinforced by a crown reinforcement or belt 6, two sidewalls 3 and two beads 4, each of these beads 4 being reinforced with a bead wire 5. The crown 2 is surmounted by a tread, not represented in this schematic figure. A carcass reinforcement 7 is wound around the two bead wires 5 in each bead 4, the turn-up 8 of this reinforcement 7 being, for example, positioned towards the outside of the tyre 1, which is here represented fitted to its wheel rim 9. The carcass reinforcement 7 is, in a way known per se, composed of at least one ply reinforced by cables, known as "radial" cables, for example of textile or metal, that is to say that these cables are positioned virtually parallel to one another and extend from one bead to the other so as to form an angle of between 80° and 90° with the median circumferential plane (plane perpendicular to the axis of rotation of the tyre which is situated at mid distance from the two beads 4 and passes through the middle of the crown reinforcement 6).

The tyre 1 is characterized in that its internal wall comprises a multilayer laminate comprising two layers 80, 81, which is self-sealing by virtue of its first layer 81 and airtight by virtue of its second layer 80, for example based on butyl rubber. The two layers 80, 81 cover substantially the entire internal wall of the tyre, extending from one sidewall to the other, at least as far as the level of the rim flange when the tyre is in the fitted position. The laminate is here positioned in such a way that the first self-sealing layer 81 is outermost radially in the tyre, with respect to the other layer 80. In other words, the self-sealing layer 81 covers the airtight layer 80 from the side of the internal cavity 82 of the tyre 1.

In this example, the layer 80 (with a thickness of 0.7 to 0.8 mm) is based on butyl rubber and exhibits a conventional formulation for an inner liner, which normally defines, in a conventional tyre, the radially internal face of the tyre intended to protect the carcass reinforcement from the diffusion of air originating from the space interior to the tyre. This airtight layer 80 thus makes it possible to inflate the tyre 1 and to keep it pressurized; its airtightness properties allow it to guarantee a relatively low rate of pressure loss, making it possible to keep the tyre inflated, in a normal operating state, for a sufficient period of time, normally several weeks or several months. The layer 81 is, for its part, composed of a self-sealing composition prepared according to the process in accordance with the invention, comprising the three essential constituents which are a solid unsaturated diene elastomer (natural rubber −100 phr), a hydrocarbon resin "Escorez 2101" from Exxon Mobil (Tg equal to 44° C.; softening point equal to approximately 90° C.; Mn equal to approximately 800 g/mol; PI equal to approximately 2.1) at a content by weight of approximately 50 phr, and approximately 15 phr of liquid polybutadiene elastomer ("Ricon 154" from Sartomer Cray Valley—Tg equal to approximately −20° C.; Mn equal to approximately 5000 g/mol and PI equal to approximately 1.4). It also comprises 0.5 phr of sulphur combined with 0.5 phr of DPG and also a very small amount (approximately 1 phr) of carbon black (N772) and approximately 3 phr of antioxidant.

The Mooney viscosity ML (1+4) at 100° C. of the NR starting elastomer is approximately 85. For this elastomer, more than 80% of the area of the distribution of the molar masses (measured by SEC) is situated above 100 000 g/mol.

More specifically, a masterbatch, precursor of the above self-sealing composition, was prepared using a single-screw extruder (L/D=40), such as represented diagrammatically in FIG. 1 (already commented on above); the mixing of the two base constituents (NR and resin) was carried out at a temperature (of between 100 and 130° C. approximately) greater than the softening temperature of the resin (of the order of 90° C.). The extruder used had two different feeds (NR, on the one hand, and resin, on the other hand). The resin was injected under pressure at a temperature of 130 to 140° C. approximately (in order to obtain good degassing) into the compounding chamber of the device 10; when the elastomer and the resin are thus intimately mixed, it was found that the undesirable adhesiveness of the masterbatch very significantly decreased.

The above extruder was provided with a die which makes it possible to extrude the masterbatch at the desired dimensions into an external mixer of the two-roll open mill type, for incorporation of other constituents, namely the cross-linking agent, the carbon black and the antioxidant, at a low temperature kept at a value below the softening temperature of the resin, in this instance by strongly cooling the rolls by circulation of water at 30° C.

The intermediate mixture (masterbatch and constituents incorporated on the external mixer) resulting from the external mixer was subsequently reintroduced into a compounding screw extruder 40, as described in FIG. 3. The liquid plasticizing agent was introduced at a temperature of the order of 80° C., sufficient to obtain a very low viscosity of the liquid elastomer. The temperature of the products during the intimate compounding of the liquid elastomer with the intermediate mixture was of the order of 80 to 110° C.

The final self-sealing composition was subsequently reheated up to a temperature of the order of 130° C. in order to be extruded through the die 49.

The layer 81, thus positioned between the layer 81 and the cavity 82 of the tyre, makes it possible to provide the tyre with effective protection against pressure losses due to accidental perforations, making possible the automatic sealing of these perforations.

If a foreign body, such as a nail, passes through the structure of the inflatable article, for example a wall, such as a sidewall, or the crown of the tyre, the composition acting as self-sealing layer is subjected to several stresses. On reacting to these stresses, and by virtue of its advantageous properties of deformability and elasticity, the said composition creates an airtight contact region all around the body. It is of little significance whether the outline or profile of the latter is uniform or regular; the flexibility of the self-sealing composition allows the latter to intrude into openings of minimum size. This interaction between the self-sealing composition and the foreign body confers airtightness on the region affected by the latter.

In the event of removal, accidental or deliberate, of the foreign body, a perforation remains: the latter is capable of creating a leak of greater or lesser significance according to the size of the perforation. The self-sealing composition, subjected to the effect of hydrostatic pressure, is sufficiently flexible and deformable to seal off the perforation by being deformed, preventing inflating gas from leaking out. In the case in particular of a tyre, it has turned out that the flexibility of the self-sealing composition prepared according to the process of the invention makes it possible to withstand, without any problem, the strains of the surrounding walls, even during phases in which the loaded tyre deforms when running.

During trials, tyres of passenger vehicle type, of 205/55 R16 size, "Michelin, Energy 3 brand", were tested. The internal wall of the tyres (already comprising the airtight layer 80) was covered with the self-sealing layer 81 described above, with a thickness of 3 mm, and then the tyres were vulcanized.

Four perforations with a diameter of 5 mm were produced on one of the fitted and inflated tyres, through the tread and the crown block, using punches which were immediately removed.

Unexpectedly, this tyre withstood being run on a rolling drum at 150 km/h, under a nominal load of 400 kg, without loss in pressure for more than 1500 km, after which distance running was halted.

Without a self-sealing composition and under the same conditions as above, the tyre thus perforated loses its pressure in less than a minute, becoming completely unsuitable for running.

The invention claimed is:

1. A process of manufacturing a self-sealing elastomer composition that includes a diene elastomer, a hydrocarbon resin with a given softening temperature, and a liquid plasticizing agent, the process comprising, in the listed order, the steps of:
    incorporating the hydrocarbon resin in the diene elastomer by kneading the hydrocarbon resin and the diene elastomer in a mixer up to a hot compounding temperature greater than the softening temperature of the hydrocarbon resin, wherein the hot compounding temperature is greater than 70° C., in order to obtain a masterbatch; wherein in the step of incorporating the hydrocarbon resin, the diene elastomer is brought into contact with the hydrocarbon resin in a liquid state, and the hydrocarbon resin is injected in the liquid state into the mixer;
    incorporating the liquid plasticizing agent in the masterbatch a crosslinking agent for at least 50% by weight of the crosslinking agent, wherein the crosslinking agent is incorporated in the masterbatch by mixing in the mixer or in a different mixer;
    incorporating the liquid plasticizing agent in the masterbatch by kneading the liquid plasticizing agent and the masterbatch in a mixer or in another mixer, in order to obtain the self-sealing composition;
    and forming the self-sealing composition as a semi-finished product capable of being used directly in the assembly of a tire blank, wherein the hydrocarbon resin has a Tg of greater than 25° C., a softening point of greater than 50° C., a number-average molar mass (Mn) of between 400 and 2000 g/mol, a polydispersity index (PI) of less than 3 (PI=Mw/Mn with Mw the weight-average molecular weight).

2. The process according to claim 1, wherein the steps of incorporating the liquid plasticizing agent and forming the self-sealing composition are carried out in a same compounding screw extruder equipped with a die.

3. The process according to claim 1, wherein the step of incorporating the hydrocarbon resin is carried out in a compounding screw extruder.

4. The process according to claim 1, wherein the step of incorporating the crosslinking agent is carried out in an external mixer of a two-roll open mill.

5. The process according to claim 4, wherein, in the step of incorporating the crosslinking agent, a maximum compounding temperature is kept below 50° C.

6. The process according to claim 4, wherein, in the step of incorporating the crosslinking agent, a maximum compounding temperature is kept below the softening temperature of the hydrocarbon resin.

7. The process according to claim 1, further comprising a step of, after the step of incorporating the hydrocarbon resin and before the step of incorporating the crosslinking agent, cooling the masterbatch to a temperature of less than 100° C.

8. The process according to claim 7, wherein the masterbatch is cooled to a temperature of less than 80° C.

9. The process according to claim 7, wherein the masterbatch is cooled to a temperature of less than the softening temperature of the hydrocarbon resin.

10. The process according to claim 1, wherein all the steps are carried out in a compounding screw extruder equipped with a die.

11. The process according to claim 1, further comprising a step of adding a filler to the self-sealing composition.

12. The process according to claim 1, wherein, during the step of incorporating the crosslinking agent, a filler is added.

13. The process according to claim 11, wherein the filler is present at a content of between 0.5 to 30 phr.

14. The process according to claim 11, wherein the filler is a carbon black.

15. The process according to claim 14, wherein the carbon black is present at a content of less than 5 phr.

16. The process according to claim 1, wherein the diene elastomer is an unsaturated diene elastomer selected from the group consisting of polybutadienes, natural rubbers, synthetic polyisoprenes, butadiene copolymers, isoprene copolymers, and mixtures thereof.

17. The process according to claim 1, wherein the diene elastomer is an unsaturated isoprene elastomer selected from the group consisting of natural rubbers, synthetic polyisoprenes, and mixtures thereof.

18. The process according to claim 16, wherein the unsaturated diene elastomer is present at a content of greater than 50 phr.

19. The process according to claim 16, wherein the unsaturated diene elastomer is a natural rubber, and the self-sealing composition includes no other elastomer.

20. The process according to claim 1, wherein the hydrocarbon resin is selected from the group consisting of cyclopentadiene (CPD) homopolymer or copolymer resins, dicyclopentadiene (DCPD) homopolymer or copolymer resins, terpene homopolymer or copolymer resins, C5 fraction homopolymer or copolymer resins, and mixtures thereof.

21. The process according to claim 1, wherein the liquid plasticizing agent is present at a content of less than 60 phr.

22. The process according to claim 1, wherein the liquid plasticizing agent has a glass transition temperature (Tg) of less than −20° C. and is selected from the group consisting of liquid elastomers, polyolefin oils, naphthenic oils, paraffinic oils, DAE oils, MES oils, TDAE oils, mineral oils, vegetable oils, ether plasticizing agents, ester plasticizing agents, phosphate plasticizing agents, sulphonate plasticizing agents, and mixtures thereof.

23. The process according to claim 22, wherein the liquid plasticizing agent is selected from the group consisting of liquid elastomers, polyolefin oils, vegetable oils, and mixtures thereof.

24. The process according to claim 1, wherein a number-average molar mass (Mn) of the liquid plasticizing agent is between 400 and 90,000 g/mol.

25. The process according to claim 1, wherein the crosslinking agent includes sulphur or a sulphur donor.

26. The process according to claim 25, wherein the crosslinking agent includes sulphur and a guanidine derivative.

27. The process according to claim 25, wherein the sulphur donor is a thiuram polysulphide.

* * * * *

UNITED STATES PATENT AND TRADEMARK OFFICE
CERTIFICATE OF CORRECTION

PATENT NO.         : 9,593,266 B2
APPLICATION NO.    : 13/575501
DATED              : March 14, 2017
INVENTOR(S)        : Jose Merino Lopez Page 1 of 1

It is certified that error appears in the above-identified patent and that said Letters Patent is hereby corrected as shown below:

In the Claims

Column 20 Claim 1
Line 5, "iniected" should read --injected--; and
Line 7, "the liquid plasticizing agent" should be deleted.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*